United States Patent Office.

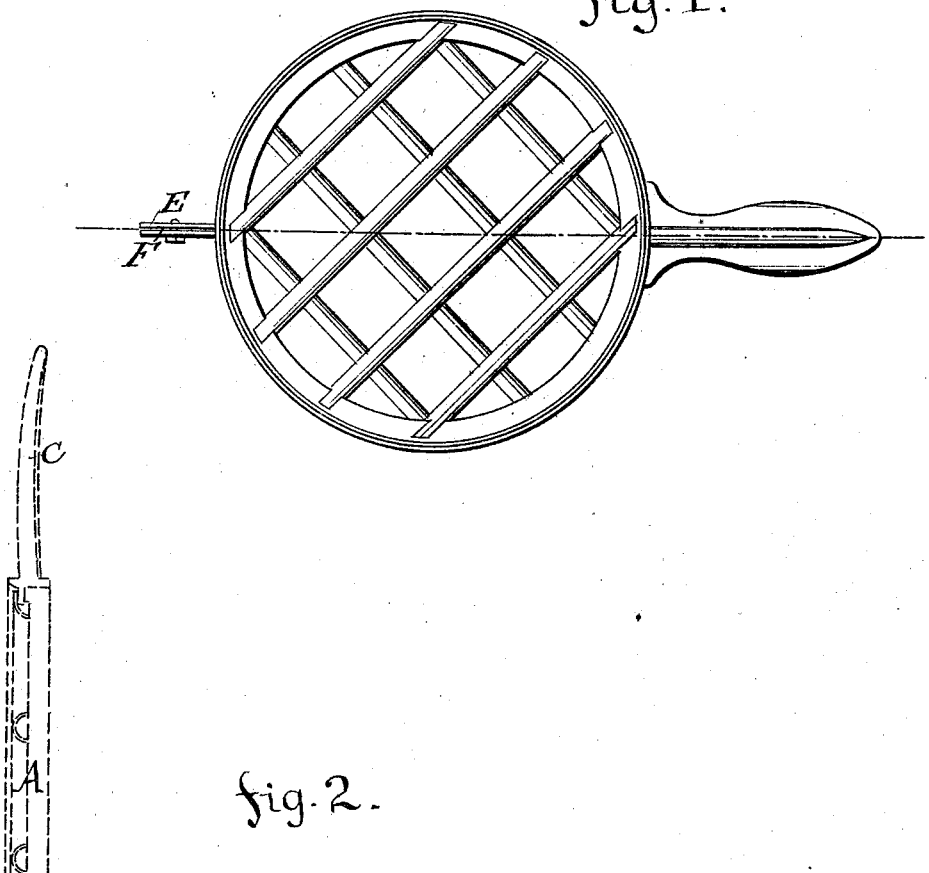

E. P. RUSSELL, OF MANLIUS, NEW YORK.

Letters Patent No. 63,753, dated April 9, 1867.

GRIDIRON.

The Schedule referred to in these Letters Patent and making part of the same.

TO ALL WHOM IT MAY CONCERN:

Be it known that I, E. P. RUSSELL, of Manlius, in the county of Onondaga, and in the State of New York, have invented certain new and useful improvements in "Gridirons for Broiling Food;" and I do hereby declare that the following is a full, clear, and exact description thereof, reference being had to the accompanying drawings, forming a part of this specification. In the drawings—

Figure 1 is a plan view.

Figure 2 is a vertical section.

The nature of my invention consists in an improved construction of reversible gridirons, so as to broil one side of the steak, or other food, then reverse the instrument and broil the other side, a movable cover to keep down the smoke being applied to the upper side.

I construct my gridiron in two halves, A B, as shown in the drawing, with the ordinary bars, and with a rim of sufficient width to admit the steak between the two halves. Each half is provided with a handle, C D, and with a square-heeled half hinge, E F, so that the halves of the instrument may be opened at a right angle, as shown in red lines in fig. 2. It will be noticed that the bars of one-half of the griddle are so disposed as to cross the bars of the other half, as shown in the drawing. By this construction it happens that the bearing upon the steak is different upon the opposite sides, so as to secure a more thorough cooking of the meat. If the bars were parallel and opposite each other, that part of the steak between them would be but little cooked. G is a cover made of sheet metal, and fits to either side of the gridiron; it is to be applied to the upper side in cooking, so as to prevent the rising of the smoke into the room.

The operation and advantage of my invention are obvious. The instrument being opened, as in fig. 2, the steak is inserted, and the gridiron is shut, and the cover is applied. After the under side is sufficiently broiled, the gridiron is simply turned over, so as to bring the other side of the steak next to the fire, and the cover is changed to the side which is then uppermost. When the steak is turned, the juices which have fallen into the bars will be turned back upon the steak instead of being wasted.

Having fully described my invention, what I claim as new, and desire to secure by Letters Patent, is—

The two halves, A C and B D, when constructed so that the bars of one-half shall cross the bars of the other, and when combined and arranged with the square-heeled hinge E F, operating as described, so as to form a reversible gridiron.

In testimony that I claim the above-described invention, I have hereunto signed my name this seventh day of January, 1867.

E. P. RUSSELL.

Witnesses:
Jo. C. CLAYTON,
T. G. CLAYTON.